(12) United States Patent
Wang et al.

(10) Patent No.: US 11,669,741 B2
(45) Date of Patent: Jun. 6, 2023

(54) METHOD AND PLATFORM FOR META-KNOWLEDGE FINE-TUNING BASED ON DOMAIN-INVARIANT FEATURES

(71) Applicant: ZHEJIANG LAB, Zhejiang (CN)

(72) Inventors: Hongsheng Wang, Hangzhou (CN); Haijun Shan, Hangzhou (CN); Shengjian Hu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/674,859

(22) Filed: Feb. 18, 2022

(65) Prior Publication Data
US 2022/0222529 A1 Jul. 14, 2022

Related U.S. Application Data

(63) Continuation of application No. PCT/CN2021/075794, filed on Feb. 7, 2021.

(30) Foreign Application Priority Data

Jan. 12, 2021 (CN) .......................... 202110037237.7

(51) Int. Cl.
*G06N 3/08* (2023.01)
*G06F 40/20* (2020.01)

(52) U.S. Cl.
CPC ............... *G06N 3/08* (2013.01); *G06F 40/20* (2020.01)

(58) Field of Classification Search
CPC ......... G06N 3/08; G06N 3/0454; G06F 40/20
See application file for complete search history.

(56) References Cited

U.S. PATENT DOCUMENTS 10,839,269 B1 11/2020 Al-Turki et al.

FOREIGN PATENT DOCUMENTS

| CN | 109308318 A | 2/2019 |
|---|---|---|
| CN | 109902798 A | 6/2019 |

(Continued)

OTHER PUBLICATIONS

Li et al. ("MetaNER: Named Entity Recognition with Meta-Learning", In Proceedings of The Web Conference 2020 (WWW '20), Apr. 20-24, 2020) (Year: 2020).*

(Continued)

*Primary Examiner* — Michael J Huntley
*Assistant Examiner* — Imad Kassim
(74) *Attorney, Agent, or Firm* — W&G Law Group

(57) ABSTRACT

Disclosed is a method for meta-knowledge fine-tuning and platform based on domain-invariant features. According to the method, highly transferable common knowledge, i.e., domain-invariant features, in different data sets of the same kind of tasks is learnt, the common domain features in different domains corresponding to different data sets of the same kind of tasks learnt in the network set are fine-tuned to be quickly adapted to any different domains. According to the present application, the parameter initialization ability and generalization ability of the universal language model of the same kind of tasks are improved, and finally a common compression framework of the universal language model of the same kind of downstream tasks is obtained through fine tuning. In the meta-knowledge fine-tuning network, a loss function of the domain-invariant features is designed in the present application, and domain-independent universal knowledge is learn.

4 Claims, 1 Drawing Sheet

(56) References Cited

FOREIGN PATENT DOCUMENTS

| | | | |
|---|---|---|---|
| CN | 110188172 A | 8/2019 | |
| CN | 111160553 A | 5/2020 | |
| CN | 111897964 A | 11/2020 | |
| CN | 111898635 A | 11/2020 | |
| CN | 112100383 A | 12/2020 | |

OTHER PUBLICATIONS

Luo et al ("CAPT: Contrastive Pre-Training for Learning Denoised Sequence Representations", Oct. 30, 2020) (Year: 2020).*
Wang et al. ("Meta Fine-Tuning Neural Language Models for Multi-Domain Text Mining", arXiv Sep. 16, 2020) (Year: 2020).*
Sun et al. ("Patient Knowledge Distillation for BERT Model Compression", arXiv, Aug. 25, 2019) (Year: 2019).*
Zhong et al. ("SAR Target Image Classification Based on Transfer Learning and Model Compression", IEEE geoscience and remote sensing letters, vol. 16, No. 3, Mar. 2019) (Year: 2019).*
International Search Report (PCT/CN2021/075794); dated Oct. 20, 2021.
CN First Office Action(202110037237.7); dated Feb. 26, 2021.

\* cited by examiner

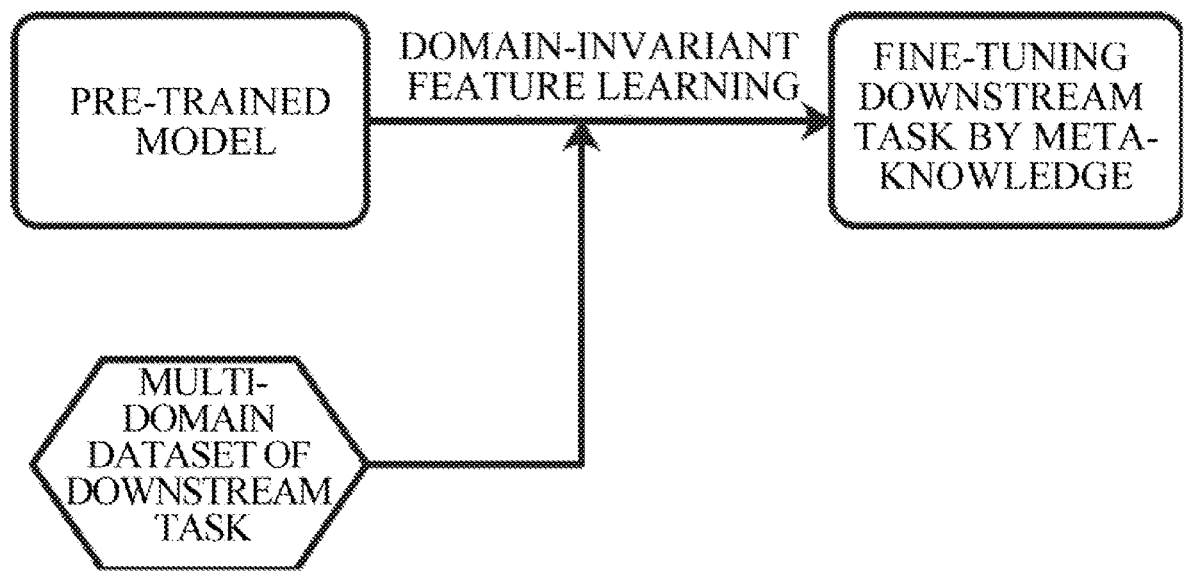

METHOD AND PLATFORM FOR META-KNOWLEDGE FINE-TUNING BASED ON DOMAIN-INVARIANT FEATURES

CROSS-REFERENCE TO RELATED APPLICATIONS

The present application is a continuation of International Application No. PCT/CN2021/075794, filed on Feb. 7, 2021, which claims priority to Chinese Application No. 202110037237.7, filed on Jan. 12, 2021, the contents of both of which are incorporated herein by reference in their entireties

TECHNICAL FIELD

The present application belongs to the field of language model compression, in particular to a method and a platform for meta-knowledge fine-tuning based on domain-invariant features.

BACKGROUND

A pre-trained neural language model improves the performance of many natural language processing tasks by fine-tuning the training set of a specific task. In the fine-tuning stage, the existing compression method of the pre-trained language model for a downstream task is to fine-tune the specific data set of the downstream task, and the effect of the compressed model obtained by training is limited by the specific data set of this kind of tasks.

SUMMARY

In view of the shortcomings of the prior art, the purpose of the present application is to provide a method for meta-knowledge fine-tuning and platform based on domain-invariant features. According to the present application, meta-knowledge based on domain-invariant features is introduced, and common domain features of the same kind of tasks are learnt from different domains corresponding to different data sets to obtain highly transferable domain-invariant knowledge; after meta-knowledge fine-tuning, the model can be fine-tuned for different domains of the same kind of tasks, with a better parameter initialization ability and a higher generalization ability, and finally, the common architecture of the same kind of tasks can be compressed.

The purpose of the present application is realized by the following technical solution: a method for meta-knowledge fine-tuning based on domain-invariant features, which comprises the following stages:

A first stage of constructing an adversarial domain classifier: adding the adversarial domain classifier by meta-knowledge fine-tuning to optimize downstream tasks; constructing the adversarial domain classifier in order that a certain kind of classifier is driven to be capable of distinguishing the categories of different domains, wherein according to the theory of adversarial machine learning, a loss function is required to be maximized, so that the domain classifier is capable of predicting real domain labels; in order that a prediction probability of the adversarial domain classifier always tends to predict a label of a wrong domain when the loss function of an exchange domain is minimized, proposing the classifier to predict a label of a direct exchange domain to minimize the loss function of the exchange domain, so that the learned features are independent of the domain.

A second stage of constructing an input feature, wherein the input feature is composed of word embedding representation and domain embedding representation.

A third stage of learning domain-invariant features: constructing a domain damage objective function based on the adversarial domain classifier; inputting the domain embedding representation of a real domain into the classifier to ensure that even if the classifier learns real domain information from the domain embedding representation of the real domain, a damaged output will still be generated; forcing the word embedding representation of BERT to hide and reveal any domain information, and ensuring the domain-invariance of the features of an input text.

Further, in the first stage, the step of constructing the adversarial domain classifier includes:

step 1.1: defining the adversarial domain classifier; considering two different domains $k_1$ and $k_2$, in order to drive a certain classifier to be capable of distinguishing the categories of different domains, constructing an adversarial domain classifier, and defining the loss function $L_{AD}$ of the adversarial domain classifier as:

$$L_{AD} = -\frac{1}{N^{k_1}+N^{k_2}} \sum_{(x_i^k, y_i^k) \in D^{k_1} \cup D^{k_2}} (y_i^k \log\sigma(x_i^k) + (1-y_i^k)\log(1-\sigma(x_i^k)))$$

$N^{k_1}$ and $N^{k_2}$ respectively represent the numbers of instance samples belonging to the domains $k_1$ and $k_2$, $D^{k_1}$ and $D^{k_2}$ respectively represent the sets of all instance samples belonging to the domains $k_1$ and $k_2$; $x_i^k$ represents an $i^{th}$ text in the set of sample examples belonging to a domain K, $y_i^k$ is a label corresponding to $x_i^k$, $k=k_1, k_2$; if the domain of the instance $x_i^k$ is k, then $y_i^k=1$, otherwise $y_i^k=0$; $\sigma(x_i^k)$ is the prediction probability of the adversarial domain classifier;

step 1.2: constructing the adversarial domain classifier based on the exchange domain; for the adversarial domain classifier, according to the theory of adversarial machine learning, the loss function $L_{AD}$ needs to be maximized so that the domain classifier is capable of predicting real domain labels, and the classifier is thereby required to predict the label of the direct exchange domain and the loss function $L_{FAD}$ of the exchange domain is minimized:

$$L_{FAD} = -\frac{1}{N^{k_1}+N^{k_2}} \sum_{(x_i^k, y_i^k) \in D^{k_1} \cup D^{k_2}} ((1-y_i^k)\log\sigma(x_i^k) + y_i^k\log(1-\sigma(x_i^k)))$$

Only the classifier is forced to predict the input text $x_i^{k_j}$ as one of any other K−1 domains except a $k_j$ domain.

Further, the second stage of constructing an input feature includes:

step 2.1: obtaining the word embedding representation: the word embedding representation $h_l(x_i^k)$ is the average pooling of the word embedding obtained by inputting a $l^{th}$ layer Transformer encoder of BERT:

$$h_l(x_i^k) = \text{Avg}(h_{l,1}(x_i^k), h_{l,2}(x_i^k), \ldots, h_{l,max}(x_i^k))$$

Avg represents average pooling, $h_{l,j}(x_i^k)$ represents the embedding representation of the $l^{th}$ layer of a $j^{th}$ word in $x_i^k$, j=1~Max, and Max represents a maximum text length;

step 2.2: obtaining the domain embedding representation: the domain embedding representation $\varepsilon_D(k)$ is the average pooling of inputting $x_i^k$ into the Transformer encoder in the last layer of BERT;

step 2.3: the input feature is $h_l(x_i^k)+\varepsilon_D(k)$.

Further, in the third stage, the domain damage objective function $L_{TDC}$ is constructed:

$$L_{TDC} = -\frac{1}{N^{k_1} + N^{k_2}} \sum_{(x_i^k, y_i^k) \in D^{k_1} \cup D^{k_2}} ((1 - y_i^k)\log\sigma(x_i^k)(h_i(x_i^k) + \varepsilon_D(k)) +$$

$$y_i^k \log(1 - \sigma(x_i^k))(h_l(x_i^k) + \varepsilon_D(k))).$$

A platform of the above method for meta-knowledge fine-tuning based on domain-invariant features comprises the following components:

A data loading component configured to obtain training samples of a pre-trained language model, wherein the training samples are labeled text samples that satisfy a supervised learning task.

An automatic compression component configured to automatically compress the pre-trained language model, including the pre-trained language model and a meta-knowledge fine-tuning module.

The meta-knowledge fine-tuning module is configured to construct a downstream task network on the pre-trained language model generated by the automatic compression component, fine-tune a downstream task scene by using a meta-knowledge of the domain-invariant features, and output a finally fine-tuned compression model; the compression model is output to a designated container for a login user to download, and comparison information about model sizes is presented before and after compression on a page of the output compression model of the platform.

A reasoning component, wherein, the login user obtains a pre-trained compression model from the platform, and the user uses the compression model output by the automatic compression component to reason new data of a natural language processing downstream task uploaded by the login user on a data set of an actual scene; and the comparison information about reasoning speeds before and after compression is presented on a page of the compression model reasoning of the platform.

The present application has the following beneficial effects:

First, the present application studies the method for meta-knowledge fine-tuning of a universal language model based on domain-invariant features: learning based on domain-invariant features. The meta-knowledge fine-tuning of a pre-trained language model for downstream the same kind of tasks provides a method for learning domain-invariant features of different data sets of the same kind of downstream tasks, and the compressed model with domain-invariant features obtained by fine-tuning is suitable for different data sets of the same kind of tasks. On the basis of the pre-trained network output from the compression architecture of the pre-trained language model, the downstream tasks are fine-tuned by the meta-knowledge fine-tuning network based on the domain-invariant features, so as to obtain a universal compression architecture of the language model for the same kind of downstream task independent of data sets.

Second, the present application proposes to learn highly transferable common knowledge in different data sets of the same kind of tasks, that is, domain-invariant features. By introducing domain-invariant features, and fine-tuning the common domain features in different domains corresponding to different data sets of the same kind of tasks learnt in network centralization, the parameter initialization ability and generalization ability of the universal language model for the same kind of tasks are improved, and finally, a universal compression architecture of universal language models of the same kind of downstream tasks is obtained.

Third, the platform for meta-knowledge fine-tuning of the universal language model based on domain-invariant features of the present application generates a universal framework of a language model for the same kind of tasks, makes full use of the fine-tuned model framework to improve the compression efficiency of the same kind of downstream tasks, and large-scale natural language processing models can be deployed in end-side devices with small memory and limited resources, thus promoting the landing process of universal deep language models in the industrial circles.

BRIEF DESCRIPTION OF DRAWINGS

FIG. 1 is a schematic diagram of the method for meta-knowledge fine-tuning of a universal language model based on domain-invariant features.

DESCRIPTION OF EMBODIMENTS

The present application discloses a method and a platform for meta-knowledge fine-tuning of a universal language model based on domain-invariant features on the basis of a universal compression architecture of a pre-trained language model. The fine-tuning method of the pre-trained language model for downstream tasks is to fine-tune the cross-domain data set of downstream tasks, and the effect of the obtained compression model is suitable for data scenes of the same kind of tasks in different domains.

As shown in FIG. 1, the present application designs a meta-knowledge fine-tuning learning method: a learning method based on domain-invariant features. In the present application, highly transferable common knowledge in different data sets of the same kind of tasks, namely domain-invariant features, are learnt. The domain-invariant features are introduced, the common domain features in different domains corresponding to different data sets of the same kind of tasks learned in network set are fine-tuned to quickly adapt to any different domains. The learning of the domain-invariant features improves the parameter initialization ability and generalization ability of the universal language models of the same kind of tasks, and finally fine-tunes the universal compression architecture of the universal language models of the same kind of downstream tasks. In the meta-knowledge fine-tuning network, the present application designs the loss function of domain-invariant features, and learns domain-independent universal knowledge, that is, minimizes the learning goal of a domain-invariant feature to drive the language model to possess a coding ability for domain-invariant features.

The method for meta-knowledge fine-tuning based on domain-invariant features of the present application includes the following steps:

step 1: constructing an adversarial domain classifier: adding the adversarial domain classifier by meta-knowledge fine-tuning to optimize downstream tasks; constructing the adversarial domain classifier in order that a certain kind of classifier is driven to be capable of distinguishing the categories of different domains, wherein according to the theory of adversarial machine learning, a loss function is required to be maximized, so that the domain classifier is capable of predicting real domain labels; in order that a prediction probability of the adversarial domain classifier always tends to predict a label of a wrong domain, for example, predicting $k_2$ to be $k_1$, when the loss function of an exchange domain is minimized. The classifier is proposed to predict a label of a direct exchange domain so as to minimize the loss function of the exchange domain; the domain labels in the loss function are interchanged, and the domain information is implicitly encoded in the prediction probability of the adversarial domain classifier, so the optimization of the loss function based on the interchanged domain makes the learned features independent of the domain.

step (1.1): defining the adversarial domain classifier; considering two different domains $k_1$ and $k_2$, in order to drive a certain classifier to be capable of distinguishing the categories of different domains, constructing an adversarial domain classifier, and defining the loss function $L_{AD}$ of the adversarial domain classifier as:

$$L_{AD} = -\frac{1}{N^{k_1}+N^{k_2}} \sum_{(x_i^k,y_i^k)\in D^{k_1}\cup D^{k_2}} (y_i^k \log\sigma(x_i^k) + (1-y_i^k)\log(1-\sigma(x_i^k)))$$

$N^{k_1}$ and $N^{k_2}$ respectively represent the numbers of instance samples belonging to the domains $k_1$ and $k_2$, $D^{k_1}$ and $D^{k_2}$ respectively represent the sets of all instance samples belonging to the domains $k_1$ and $k_2$; $x_i^k$ represents an $i^{th}$ text in the set of sample examples belonging to a domain K, $y_i^k$ is a label corresponding to $x_i^k$, $k=k_1, k_2$; if the domain of the instance $x_i^k$ is k, then $y_i^k=1$, otherwise $y_i^k=0$; $\sigma(x_i^k)$ is the prediction probability of the adversarial domain classifier.

step (1.2): constructing the adversarial domain classifier based on the exchange domain; for the adversarial domain classifier, according to the theory of adversarial machine learning, the loss function $L_{AD}$ needs to be maximized so that the domain classifier is capable of predicting real domain labels; the classifier is required to predict the label of the direct exchange domain and the loss function $L_{FAD}$ of the exchange domain is minimized:

$$L_{FAD} = -\frac{1}{N^{k_1}+N^{k_2}} \sum_{(x_i^k,y_i^k)\in D^{k_1}\cup D^{k_2}} ((1-y_i^k)\log\sigma(x_i^k) + y_i^k\log(1-\sigma(x_i^k))),$$

and when minimizing the loss function $L_{FAD}$ of the exchange domain, the prediction probability $\sigma(x_i^k)$ of the adversarial domain classifier always tends to predict a label of a wrong domain, for example, predicting $k_2$ to be $k_1$; the loss function $L_{FAD}$ of the exchange domain only has the exchange of domain labels, the domain information is implicitly encoded in the prediction probability $\sigma(x_i^k)$ of the adversarial domain classifier, so the optimization of the loss function $L_{FAD}$ based on the interchanged domain makes the learned features independent of the domain; similar situation applies to multiple domains, for example in a case of different data sets of a certain type of tasks, in which the classifier is only forced to predict the input text $x_i^{k_j}$ as one of any other domains K−1 except the domain $k_j$.

step 2: constructing an input feature, wherein the input feature is composed of word embedding representation $h_l(x_i^k)$ and domain embedding representation $\varepsilon_D(k)$; i.e., $h_l(x_i^k)+\varepsilon_D(k)$; in the structure of Transformer encoder in BERT, the word embedding representation $h_l(x_i^k)$ means the average pooling of word embedding obtained by inputting the instance $x_i^k$ into the $l^{th}$ layer; a domain embedded feature $\varepsilon_D(k)$ of the real domain label of the instance $(x_i^k, y_i^k)$ is input, where $\varepsilon(\cdot)$ represents the domain embedded feature of $X_i^k$ output by BERT, that is, the input $x_i^k$ corresponds to the average pooling of the last layer Transformer encoder of BERT.

step (2.1): obtaining the word embedding representation: considering the neural architecture of the Transformer encoder in BERT, letting the word embedding representation $h_l(x_i^k)$ be the average pooling of the word embedding obtained by inputting the $l^{th}$ layer Transformer encoder of BERT:

$$h_l(x_i^k)=\mathrm{Avg}(h_{l,1}(x_i^k),h_{l,2}(x_i^k),\ldots,h_{l,max}(x_i^k))$$

Avg represents average pooling, $h_{l,j}(x_i^k)$ represents the embedding representation of the $l^{th}$ layer of a $j^{th}$ word in $x_i^k$, j=1~Max, and Max represents a maximum text length.

step (2.2): obtaining the domain embedding representation: learning a domain embedded feature of the real domain label of the input instance $(x_i^k, y_i^k)$, which is expressed as $\varepsilon_D(k)$, wherein $\varepsilon(\cdot)$ indicates the embedded feature of $x_i^k$ output by BERT; for the BERT, the embedded feature is the average pooling of inputting $x_i^k$ into the Transformer encoder in the last layer of BERT;

step 3: meta-knowledge fine-tuning network based on domain-invariant features. A damage target function of the d domain is constructed:

$$L_{TDC} = -\frac{1}{N^{k_1}+N^{k_2}} \sum_{(x_i^k,y_i^k)\in D^{k_1}\cup D^{k_2}} ((1-y_i^k)\log\sigma(x_i^k)(h_l(x_i^k)+\varepsilon_D(k)) + y_i^k\log(1-\sigma(x_i^k))(h_l(x_i^k)+\varepsilon_D(k)))$$

$\sigma(x_i^k)$ is the prediction probability value based on the input feature of the adversarial domain label. The embedded feature $\varepsilon_D(k)$ of the real domain is intentionally input into the classifier, which ensures that even if the classifier learns the real domain information from the embedded feature $\varepsilon_D(k)$ of the real domain, it can only generate a damaged output. In this way, the feature representation $h_l(x_i^k)$ of BERT is forced to hide and reveal any domain information, thus ensuring the domain-invariance of the features of the instance $x_i^k$.

The present application discloses a platform of a method for meta-knowledge fine-tuning based on domain-invariant features, which comprises the following components:

A data loading component configured to obtain training samples of a pre-trained language model, wherein the training samples are labeled text samples that satisfy a supervised learning task.

An automatic compression component configured to automatically compress the pre-trained language model, including the pre-trained language model and a meta-knowledge fine-tuning module;

The meta-knowledge fine-tuning module is configured to construct a downstream task network on the pre-trained language model generated by the automatic compression component, fine-tune a downstream task scene by using meta-knowledge of the domain-invariant features, and output a finally fine-tuned compression model; the compression model is output to a designated container for a login user to download, and comparison information about model sizes before and after compression is presented on a page of the output compression model of the platform.

A reasoning component, wherein, the login user obtains a pre-trained compression model from the platform, and the user uses the compression model output by the automatic compression component to reason new data of a natural language processing downstream task uploaded by the login user on a data set of an actual scene; and the comparison information about reasoning speeds before and after compression is presented on a page of the compression model reasoning of the platform.

Next, the technical solution of the present application will be further described in detail with reference to a natural language inference task in an application scenario of intelligent customer service.

The natural language inference task in the intelligent customer service scenario usually involves a user giving a pair of sentences, and the intelligent customer service judging whether the semantics of the two sentences are similar, contradictory or neutral. Because it is also a classification problem, it is also called a sentence pair classification problem. An MNLI dataset provides a training example from the field of intelligent customer service application. The purpose is to infer whether two sentences are similar, contradictory or irrelevant. A BERT model of the natural language inference task uploaded by the login user and the MNLI data set in the field of intelligent customer service application are obtained through the data loading component of the platform.

The BERT pre-trained language model is generated by the automatic compression component of the platform.

The BERT pre-trained model generated by the automatic compression component is loaded through the platform, and a model of the natural language inference task is constructed on the generated pre-trained model.

The student model obtained based on the meta-knowledge fine-tuning module of the automatic compression component is fine-tuned, a natural language inference task model in the intelligent customer service scenario is constructed on the basis of the pre-trained language model, the downstream task scenario is fine-tuned by using the meta-knowledge of typicality scores, and the finally fine-tuned student model, that is, a compression model of the pre-trained language model containing the natural language inference task required by the login user, is output.

The compressed model is output to a designated container for the login user to download, and 5%, 10% and 20% of the data in each domain is randomly sampled from the training data for meta-knowledge fine-tuning. The comparison information of THE model accuracy before and after fine-tuning is presented on the page of the output compressed model of the platform, as shown in Table 1 below.

TABLE 1

Comparative information of the meta-knowledge of the BERT model of the natural language inference task before and after fine-tuning

| Method | Telephone | Government | Travel | Novel | Average |
|---|---|---|---|---|---|
| Meta-knowledge before fine-tuning | 82.5% | 84.9% | 83.1% | 82.0% | 82.1% |
| Meta-knowledge after fine-tuning | 84.6% | 86.3% | 85.4% | 84.6% | 84.5% |

As can be seen from Table 1, through the reasoning component of the platform, the compressed model output by the platform is used to reason the MNLI test set data of the natural language inference task uploaded by the login user in the intelligent customer service scenario, and the reasoning accuracy is improved by 2.1%, 1.4%, 2.3%, 2.6% and 2.4% respectively in the domains of telephone, government, travel and novel after meta-knowledge fine-tuning is presented on the page of the compressed model reasoning of the platform, compared with that before meta-knowledge fine-tuning.

What is claimed is:

1. A method for meta-knowledge fine-tuning based on domain-invariant features, comprising the following stages:
   a first stage of constructing an adversarial domain classifier: adding the adversarial domain classifier by meta-knowledge fine-tuning to optimize downstream tasks, in order that the adversarial domain classifier is driven to be capable of distinguishing categories of different domains, constructing the adversarial domain classifier, wherein a loss optimization needs to be executed to reduce a performance of the adversarial domain classifier, so that the domain classifier is capable of predicting real domain labels; in order that a prediction probability of the adversarial domain classifier is any degree of one or more predicted wrong labels when the loss function of an exchange domain is minimized, the classifier performs a prediction on a label of a direct exchange domain to minimize the loss function of the exchange domain, so that the learned features are independent of the domain;
   a second stage of constructing an input feature, wherein the input feature is composed of word embedding representation and domain embedding representation;
   a third stage of learning domain-invariant features: constructing a domain damage objective function based on the adversarial domain classifier; inputting the domain embedding representation of a real domain into the classifier to ensure that a damaged output will always be generated; forcing the word embedding representation of Bidirectional Encoder Representation from Transformers (BERT) to be hidden domain information, and ensuring the domain-invariance of the features of an input text;
   wherein the method for meta-knowledge fine-tuning based on domain-invariant features is implemented by a platform, and the platform comprises the following components:
   a data loading component configured to obtain training samples of a pre-trained language model, wherein the training samples are labeled text samples that satisfy a supervised learning task;
   an automatic compression component configured to automatically compress the pre-trained language model, comprising the pre-trained language model and a meta-knowledge fine-tuning module;
   wherein the meta-knowledge fine-tuning module is configured to construct a downstream task network on the pre-trained language model generated by the automatic compression component, fine-tune a downstream task scene by using meta-knowledge of the domain-invariant features, and output a finally fine-tuned compression model; the compression model is output to a designated container for a login user to download, and comparison information about model sizes before and after compression is presented on a page of the output compression model of the platform;
   a reasoning component, wherein the login user obtains a pre-trained compression model from the platform, and the user uses the compression model output by the automatic compression component to reason new data of a natural language processing downstream task uploaded by the login user on a data set of an actual scene; and the comparison information about reasoning speeds before and after compression is presented on a page of the compression model reasoning of the platform.

2. The method for meta-knowledge fine-tuning based on domain-invariant features according to claim 1, wherein in the first stage, the step of constructing the adversarial domain classifier comprises:

step 1.1: defining the adversarial domain classifier; taking two different domains $k_1$ and $k_2$ into consideration, in order to drive the adversarial domain classifier to be capable of distinguishing the categories of different domains, constructing an adversarial domain classifier, and defining the loss function $L_{AD}$ of the adversarial domain classifier as:

$$L_{AD} = -\frac{1}{N^{k_1} + N^{k_2}} \sum_{(x_i^k, y_i^k) \in D^{k_1} \cup D^{k_2}} (y_i^k \log \sigma(x_i^k) + (1 - y_i^k) \log(1 - \sigma(x_i^k)))$$

where $N^{k_1}$ and $N^{k_2}$ respectively represent the numbers of instance samples belonging to the domains $k_1$ and $k_2$, $D^{k_1}$ and $D^{k_2}$ represent the sets of all instance samples belonging to the domains $k_1$ and $k_2$; $x_i^k$ represents an $i^{th}$ text in the set of sample examples belonging to a domain K, $y_i^k$ represents a label corresponding to $x_i^k$, $k=k_1, k_2$; if the domain of the instance $x_i^k$ is k, $y_i^k=1$, if the domain of the insurance otherwise $x_i^k$ is not k, $y_i^k=0$; and $\sigma(x_i^k)$ is the prediction probability of the adversarial domain classifier;

step 1.2: constructing the adversarial domain classifier based on the exchange domain; wherein for the adversarial domain classifier, the loss optimization needs to be executed to reduce a performance of the adversarial domain classifier so that the domain classifier is not capable of predicting real domain labels, and the classifier is thereby required to predict the label of the direct exchange domain and the loss function $L_{FAD}$ of the exchange domain is minimized:

$$L_{FAD} = -\frac{1}{N^{k_1} + N^{k_2}} \sum_{(x_i^k, y_i^k) \in D^{k_1} \cup D^{k_2}} ((1 - y_i^k) \log \sigma(x_i^k) + y_i^k \log(1 - \sigma(x_i^k)))$$

wherein only the classifier is forced to predict the input text $x_i^{k_j}$ as one of any other K−1 domains except a $k_j$ domain.

3. The method for meta-knowledge fine-tuning based on domain-invariant features according to claim 2, wherein the second stage of constructing an input feature comprises:

step 2.1: obtaining the word embedding representation: the word embedding representation $h_l(x_i^k)$ is the average pooling of the word embedding obtained by inputting a $l^{th}$ layer Transformer encoder of BERT:

$$h_l(x_i^k) = Avg(h_{l,1}(x_i^k), h_{l,2}(x_i^k), \ldots, h_{l,max}(x_i^k))$$

where Avg represents average pooling, $h_{l,j}(x_i^k)$ represents the embedding representation of the $l^{th}$ layer of a $j^{th}$ word in $x_i^k$, j=1~Max, and Max represents a maximum text length;

step 2.2: obtaining the domain embedding representation: the domain embedding representation $\varepsilon_D(k)$ is the average pooling of inputting $x_i^k$ into the Transformer encoder in the last layer of BERT;

step 2.3: the input feature is $h_l(x_i^k) + \varepsilon_D(k)$.

4. The method for meta-knowledge fine-tuning based on domain-invariant features according to claim 3, wherein in the third stage, the domain damage objective function $L_{TDC}$ is constructed:

$$L_{TDC} = -\frac{1}{N^{k_1} + N^{k_2}} \sum_{(x_i^k, y_i^k) \in D^{k_1} \cup D^{k_2}} ((1 - y_i^k) \log \sigma(x_i^k)(h_l(x_i^k) + \varepsilon_D(k)) +$$

$$y_i^k \log(1 - \sigma(x_i^k))(h_l(x_i^k) + \varepsilon_D(k))).$$

* * * * *